United States Patent
Satoh et al.

(10) Patent No.: US 10,654,478 B2
(45) Date of Patent: May 19, 2020

(54) CRUISE CONTROL APPARATUS AND CRUISE CONTROL SYSTEM

(71) Applicant: HITACHI AUTOMOTIVE SYSTEMS, LTD., Hitachinaka-shi, Ibaraki (JP)

(72) Inventors: Seiichi Satoh, Ibaraki (JP); Toshiyuki Innami, Ibaraki (JP); Junya Takahashi, Tokyo (JP); Yuki Akiyama, Tokyo (JP)

(73) Assignee: HITACHI AUTOMOTIVE SYSTEMS, LTD., Hitahcinaka-Shi (JP)

( * ) Notice: Subject to any disclaimer, the term of this patent is extended or adjusted under 35 U.S.C. 154(b) by 45 days.

(21) Appl. No.: 16/072,315

(22) PCT Filed: Jan. 13, 2017

(86) PCT No.: PCT/JP2017/000915
§ 371 (c)(1),
(2) Date: Jul. 24, 2018

(87) PCT Pub. No.: WO2017/145555
PCT Pub. Date: Aug. 31, 2017

(65) Prior Publication Data
US 2019/0031191 A1   Jan. 31, 2019

(30) Foreign Application Priority Data
Feb. 26, 2016   (JP) .................. 2016-035032

(51) Int. Cl.
*B60W 10/18*   (2012.01)
*B60W 10/20*   (2006.01)
(Continued)

(52) U.S. Cl.
CPC ............ *B60W 30/12* (2013.01); *B60W 10/18* (2013.01); *B60W 10/20* (2013.01);
(Continued)

(58) Field of Classification Search
CPC ...... B60W 10/18; B60W 10/20; B60W 30/12; B60W 30/18145; B60W 40/072; B60W 2420/42; B60W 2520/105; B60W 2520/125; B60W 2520/143; B60W 2520/146; B60W 2720/10; B60W 2720/106; B60W 2720/125; B62D 6/00; G01S 2013/9321

See application file for complete search history.

(56) References Cited

U.S. PATENT DOCUMENTS

2005/0240334 A1* 10/2005 Matsumoto ........ B60K 31/0083
701/93
2009/0192675 A1   7/2009 Yamakado et al.
(Continued)

FOREIGN PATENT DOCUMENTS

JP   H07-081603 A   3/1995
JP   2008-285066 A   11/2008
(Continued)

OTHER PUBLICATIONS

Supplementary European Search Report issued in corresponding European Patent Application No. 17755997.8, dated Jul. 17, 2019.
(Continued)

*Primary Examiner* — Anshul Sood
(74) *Attorney, Agent, or Firm* — Foley & Lardner LLP

(57) ABSTRACT

A cruise control apparatus according to the present invention comprises a curve shape detection unit that detects the shape of a curve, an estimation trajectory calculation means that, on the basis of vehicle speed, calculates an estimated trajectory that satisfies a relationship in which a G-G diagram, which is a relationship between lateral acceleration and longitudinal acceleration, draws an arc, and a steering start point determination unit that determines a steering start point in front of a curve so that the estimated trajectory falls within the curve.

13 Claims, 13 Drawing Sheets

G–G DIAGRAM

(51) Int. Cl.
*B60W 30/12* (2020.01)
*B62D 6/00* (2006.01)
*B60W 40/072* (2012.01)
*B60W 30/18* (2012.01)
*G05D 1/02* (2020.01)
*G01S 13/931* (2020.01)

(52) U.S. Cl.
CPC .... *B60W 30/18145* (2013.01); *B60W 40/072* (2013.01); *B62D 6/00* (2013.01); *G05D 1/0223* (2013.01); *B60W 2420/42* (2013.01); *B60W 2520/105* (2013.01); *B60W 2520/125* (2013.01); *B60W 2552/20* (2020.02); *B60W 2552/30* (2020.02); *B60W 2720/10* (2013.01); *B60W 2720/106* (2013.01); *B60W 2720/125* (2013.01); *G01S 2013/9321* (2013.01)

(56) References Cited

U.S. PATENT DOCUMENTS

| | | | |
|---|---|---|---|
| 2010/0256856 A1 | 10/2010 | Taguchi | |
| 2012/0150411 A1* | 6/2012 | Oosawa | B60K 31/0008 701/96 |
| 2012/0209489 A1* | 8/2012 | Saito | B60T 7/042 701/70 |
| 2013/0006473 A1 | 1/2013 | Buerkle | |
| 2013/0151074 A1* | 6/2013 | Takeuchi | B60W 10/06 701/37 |
| 2014/0121932 A1* | 5/2014 | Zeng | B60W 10/06 701/93 |

FOREIGN PATENT DOCUMENTS

| | | |
|---|---|---|
| JP | 2009-040092 A | 2/2009 |
| JP | 2011-098606 A | 5/2011 |
| JP | 2013-067382 A | 4/2013 |
| JP | 2015-120412 A | 7/2015 |

OTHER PUBLICATIONS

International Search Report with English translation and Written Opinion issued in corresponding application No. PCT/JP2017/000915 dated May 16, 2017.

Office Action issued in corresponding Japanese Patent Application No. 2018-501033, dated May 8, 2019, with English machine translation.

* cited by examiner

EXAMPLE OF CURVE SHAPE OF ROAD

CURVATURE CHANGE CHARACTERISTICS

VEHICLE SPEED, LONGITUDINAL ACCELERATION, AND LATERAL ACCELERATION WITH RESPECT TO TRAVEL DISTANCE

G-G DIAGRAM

VEHICLE SPEED, LONGITUDINAL ACCELERATION, AND LATERAL ACCELERATION WITH RESPECT TO TRAVEL DISTANCE

G-G DIAGRAM

FRONT OF VEHICLE

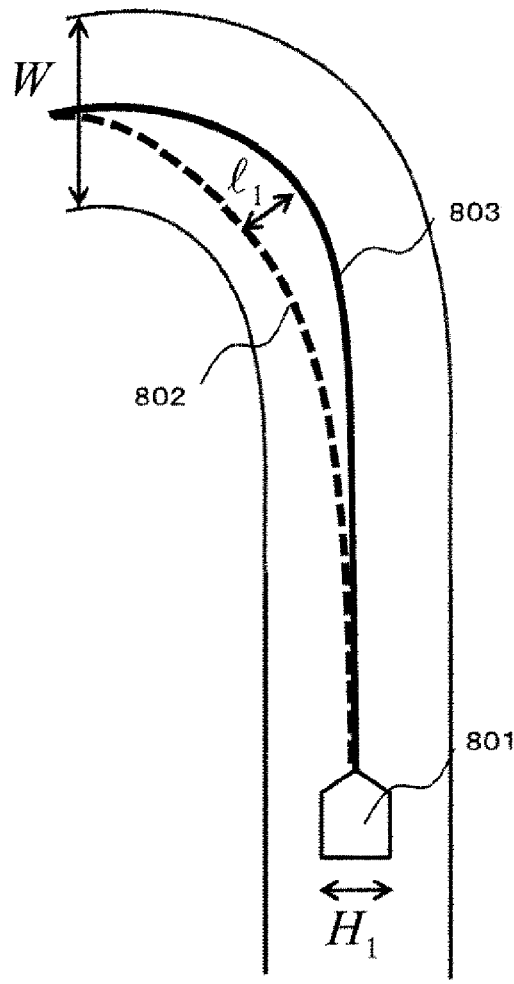
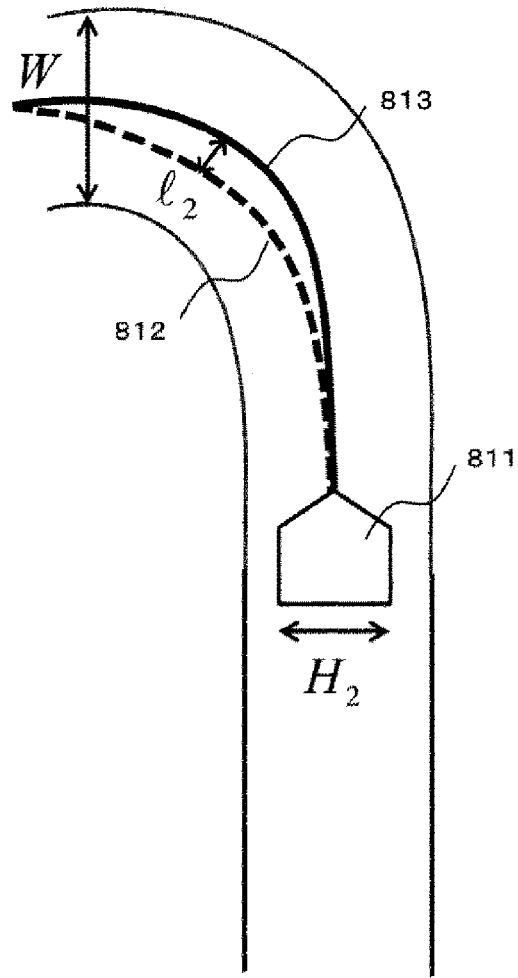
VEHICLE HAVING
SMALL VEHICLE WIDTH
VEHICLE HAVING
LARGE VEHICLE WIDTH
FIG. 14A
FIG. 14B

CRUISE CONTROL APPARATUS AND CRUISE CONTROL SYSTEM

TECHNICAL FIELD

The present invention relates to a cruise control apparatus for controlling traveling of a vehicle.

BACKGROUND ART

Recently, development of an advanced driving support system (ADAS) and automated driving related technology in an automobile has been rapidly advanced. Adaptive cruise control, a lane keep assist system, emergency automatic braking, and the like have been put into practical use as functions to automate part of driving operations.

Regarding a lateral motion, for example, PTL 1 is cited as a related prior art.

PTL 1 discloses a method in which a vehicle is caused to perform curve traveling while offering a comfortable ride by performing a steering operation to tilt a vehicle body in accordance with curvature from a steering start point to a curve start point. However, PTL 1 does not mention a case where the vehicle travels along a curve with acceleration/deceleration.

Meanwhile, as a control technique associating acceleration/deceleration with a lateral motion, PTL 2 proposes a method of controlling acceleration/deceleration based on lateral jerk generated by steering.

CITATION LIST

Patent Literature

PTL 1: JP H7-81603 A
PTL 2: JP 2008-285066 A

SUMMARY OF INVENTION

Technical Problem

However, these techniques are systems in which the vehicle automatically controls only one of a longitudinal motion and a lateral motion of the vehicle.

In particular, the lateral motion in PTL 2 is based on steering by a human driver. It is thought that in driving by the human driver, strict trajectory following control with respect to a predetermined travel trajectory is not performed, and that the driver controls lateral motions and longitudinal motions of the vehicle at the same time while always assuming an approximate trajectory on which the driver wants to travel ahead and the degree of acceleration/deceleration.

In automated driving in which a steering operation is performed merely along a shape of a road, it is not clear how to achieve a smooth motion in the case of accompanying acceleration/deceleration, and there is still room for consideration regarding establishment of a lateral motion control method including an steering operation that considers acceleration/deceleration.

In particular, earnest investigation by the authors of the present invention found that a travel trajectory that draws an ideal G-G diagram (to be described later) in a case where steering or acceleration/deceleration is performed only on an automobile side does not match an actual curved road. The investigation also found a new problem that steering control of automated driving along a shape of the road as in a conventional way does not fall within an actual curve.

Solution to Problem

To solve the above problem, a cruise control apparatus according to the present application includes a traffic lane shape detection unit that detects a traffic lane shape of a curve, a G-vectoring control (GVC) trajectory calculation means that calculates a travel trajectory that, on the basis of a vehicle speed, satisfies a relationship in which a G-G diagram, which is a relationship between lateral acceleration and longitudinal acceleration, draws an arc, and a steering start point determination unit that determines a steering start point in front of the curve so that the travel trajectory obtained by the GVC trajectory calculating means falls within a traffic lane detected by the traffic lane shape detection unit.

Advantageous Effects of Invention

According to the present invention, in a series of motion states in which a vehicle has traveled in a straight section starts turning while decelerating, finishes turning while accelerating, and then travels straight again, it is possible to achieve automated driving in which an acceleration vector transitions in an arc and that ensures comfort and safety without a traffic lane deviation by changing the steering start point according to the shape of the road in the real environment.

BRIEF DESCRIPTION OF DRAWINGS

FIG. 14 is diagrams illustrating a difference in a steering start point between a vehicle having a small vehicle width (a) and a vehicle having a large vehicle width in a traffic lane of the same shape (b).

DESCRIPTION OF EMBODIMENTS

First Embodiment

A first embodiment of the present invention will be described with reference to the drawings. In the present embodiment, a steering start point determination unit for applying a trajectory that considers acceleration/deceleration control in order to make an acceleration vector transition in arc in a real environment will be described as a steering start point determination device Then, as a cruise control apparatus incorporating a method of determining the steering start point, a mode including a control mechanism in which information necessary for determining the steering start point is input to the steering start point determination device, and steering is started at a determined steering start point, and at the same time acceleration/deceleration is controlled will be described.

First, it will be shown that in order that the vehicle smoothly performs curve traveling, it is not necessarily sufficient just to perform steering along a curve shape of a road, and then a method of controlling acceleration/deceleration based on lateral jerk and a preferred trajectory on which a vehicle based on the control method travels will be described.

Figure 1:
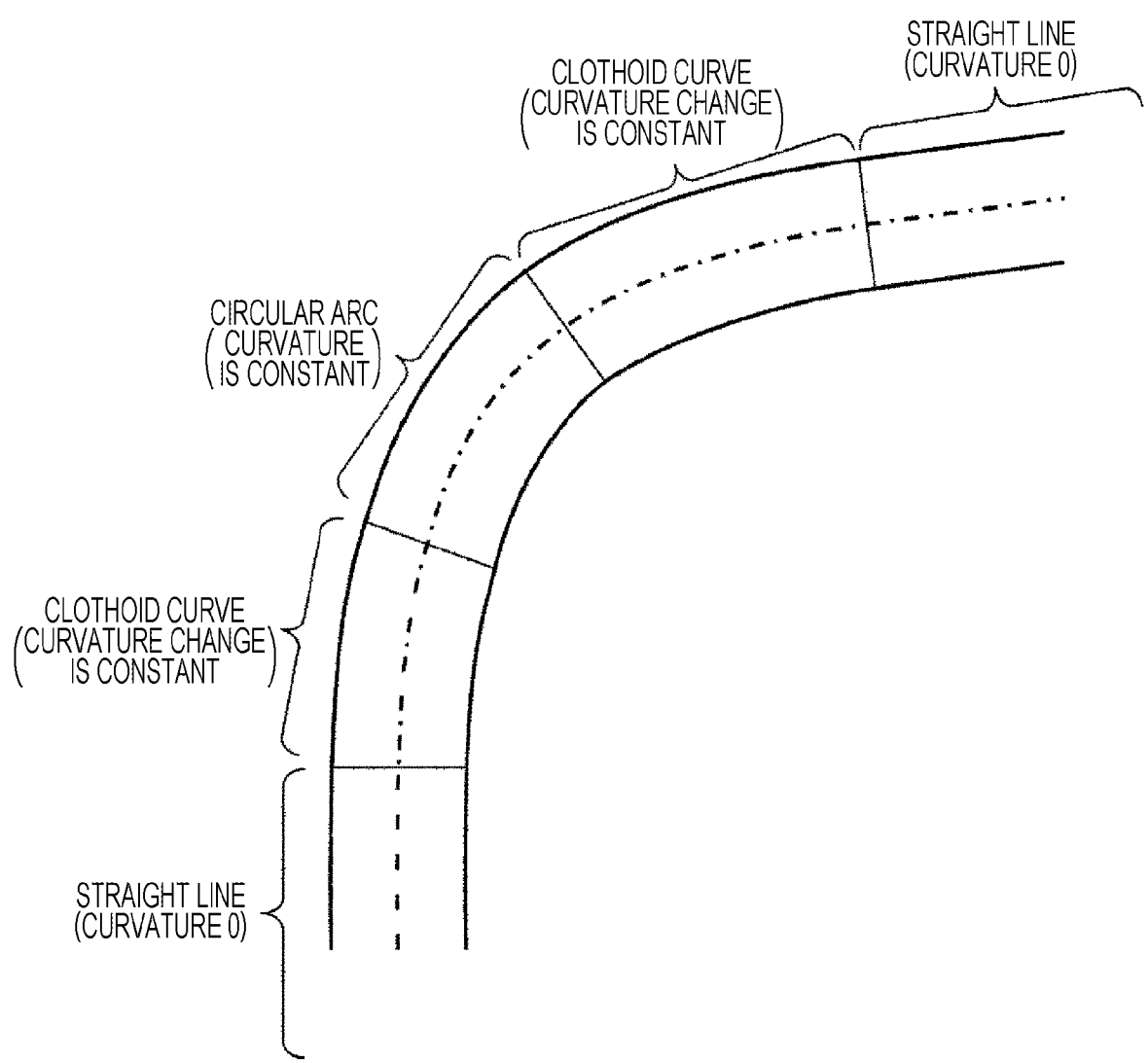
FIG. 1 is a diagram illustrating an exemplary shape of a road including a curve section.

FIG. 1 illustrates a part of a typical shape of a road including a curve section. In general, a curve shape of a road is designed with a combination of a clothoid curve and an arc. The arc has a constant curvature, whereas the clothoid curve has a constant curvature change rate with respect to a travel distance. When a straight line and the arc are connected directly, the curvature changes discontinuously from 0 to an arc curvature having a constant value at a connection point. However, a curve shape in which no discontinuous point of curvature occurs can be obtained by connecting in order of straight line-clothoid curve-arc-clothoid curve-straight line.

The road formed by the clothoid curve is designed on the premise that the vehicle travels at a constant speed. Since the lateral acceleration is proportional to the curvature, as long as the speed is kept constant, the lateral acceleration changes at a constant rate with respect to time.

However, since generally the vehicle travels with acceleration/deceleration except for the case of traveling an expressway at a constant speed, a rate of change of the lateral acceleration with respect to time is not constant.

In addition, in normal driving, deceleration is performed in a section where the curvature increases and acceleration is performed in a section where the curvature decreases. At this time, it is not sufficient to pay attention only to the lateral acceleration as force acting on the vehicle and an occupant. Since the longitudinal acceleration due to an increase and decrease in speed and the lateral acceleration due to a change of a progression direction act at the same time, it is necessary to consider the transition of the acceleration vector obtained by combining the longitudinal acceleration and the lateral acceleration.

In such a scene, it is considered to apply G vectoring control (GVC) described in the above-mentioned PTL 2 that is perceived to bring about ideal cooperation between the longitudinal motion and the lateral motion in both aspects of ride comfort and handling stability, and application of G vectoring control (GVC) described in the above-mentioned PTL 2. In a basic application form of GVC, a value obtained by multiplying input of lateral jerk that is a time rate of the lateral acceleration generated by the lateral motion of the vehicle by a gain is output as the longitudinal acceleration, and the longitudinal motion is controlled according to the output value. Since the lateral acceleration is determined by the speed and the curvature of the trajectory on which the vehicle travels, the lateral jerk corresponds to the temporal change of the curvature, and as a result the speed is controlled on the basis of the temporal change of the curvature of the trajectory.

First, it will be described that a speed profile and an acceleration profile are uniquely determined by giving an initial speed to any trajectory by performing acceleration/deceleration in accordance with the lateral jerk according to the GVC.

Here, the speed profile refers to the transition of the speed with respect to the travel distance, or the transition of the speed with respect to time. The acceleration profile refers to the transition of the acceleration with respect to the travel distance, or the transition of the acceleration with respect to time.

The basic control law of the GVC is expressed as follows, taking Gx as the longitudinal acceleration, Gy as the lateral acceleration, and Cxy as a GVC gain.

$$G_x = -C_{xy} \cdot \dot{G}_y \qquad \text{[Equation 1]}$$

When both sides are integrated and expressed as a relational expression of a speed V, the following equation is obtained, taking Vi for the initial speed.

$$V = -C_{xy} \cdot G_y + V_i \qquad \text{[Equation 2]}$$

Here, a relationship between curvature κ, lateral acceleration Gy, and the speed V is expressed as follows.

$$\kappa = \frac{G_y}{V^2} \qquad \text{[Equation 3]}$$

From Equations 2 and 3, a relationship between the speed V and the curvature κ is expressed as follows.

$$V = \frac{-1 + \sqrt{1 + 4C_{xy}V_i\kappa}}{2C_{xy}\kappa} \qquad \text{[Equation 4]}$$

Since κ is the curvature at a position where the vehicle is traveling, the above is differentiated with attention to the fact that κ is a function of time, the following equation is obtained.

$$G_x = \frac{\partial \kappa}{\partial x} \frac{-1 + \sqrt{1 + 4C_{xy}V_i\kappa}}{4C_{xy}^2\kappa^3} \qquad \text{[Equation 5]}$$

$$\left( \frac{2C_{xy}V_i\kappa}{\sqrt{1+4C_{xy}V_i\kappa}} - \sqrt{1+4C_{xy}V_i\kappa} + 1 \right)$$

An expression by the shape of the travel trajectory of deceleration by the GVC can be obtained.

An acceleration side can be calculated in a similar way and a speed at any position on the trajectory can be obtained. Therefore, both the longitudinal acceleration and the lateral acceleration at each position on the trajectory can be obtained. Therefore, it is possible to draw a G-G diagram illustrating the transition of the acceleration vector with respect to any trajectory and the initial speed, with a horizontal axis representing longitudinal acceleration Gx and a vertical axis representing the lateral acceleration Gy.

Note that in Equation 5, the fact that ∂κ/∂x is multiplied entirely means that in a section in which curvature is constant on the trajectory, that is, in a straight section in which curvature is 0 and constant and a section of a shape constituting a part of circumference in which curvature is nonzero and constant and, ∂κ/∂x=0 is established, and since the lateral acceleration does not change and the lateral jerk is 0, the vehicle travels at a constant speed without performing acceleration/deceleration.

Furthermore, in the numerator of Equation 4, the curvature κ is within the square root, whereas in the denominator, the curvature κ is the first order term. Therefore, it can be read that in a situation where the curvature increases with traveling on the trajectory, deceleration is performed. On the other hand, in a situation where the curvature decreases, acceleration is performed. Therefore, unless the curvature increases or decreases, the sign of the longitudinal acceleration does not change. Furthermore, if the sign of the curvature does not change, the sign of the lateral acceleration does not change.

Therefore, attention is paid to a section where the curvature of either left or right curve monotonously increases or monotonically increases, as the minimum unit of the elements constituting the trajectory. This section is a range where the G-G diagram falls into one quadrant without changing the sign of the longitudinal acceleration and the sign of the lateral acceleration.

Figure 2A:
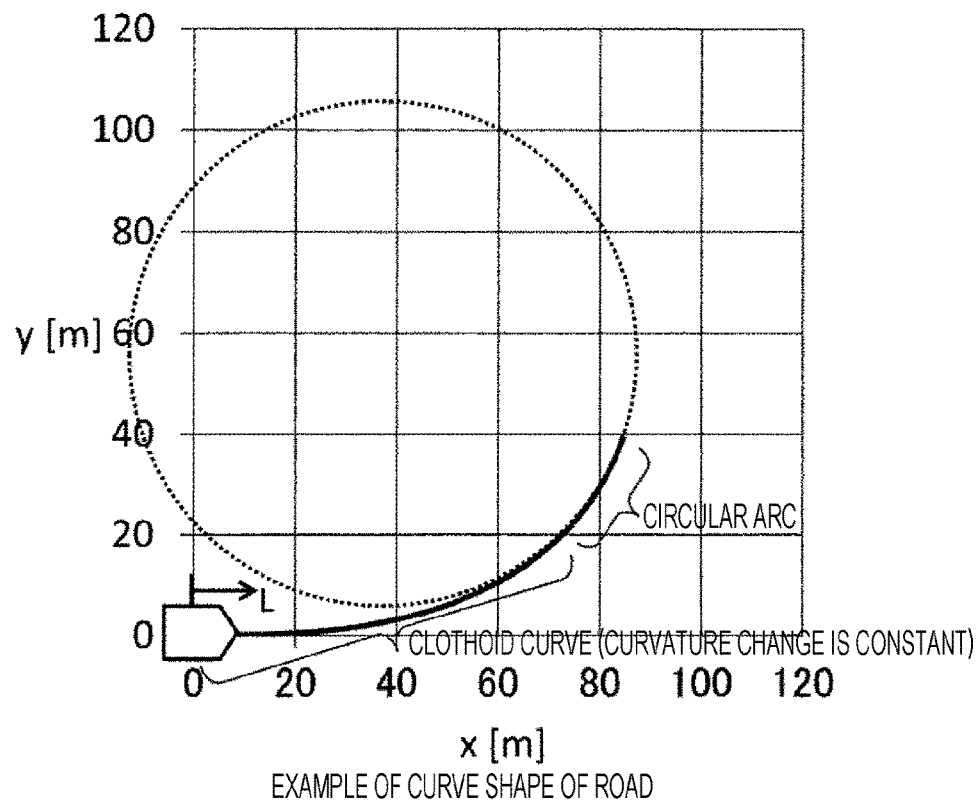
FIG. 2 is graphs illustrating an example of a curve shape of a road (a) and an example of curvature change characteristics (b).
Figure 2B:
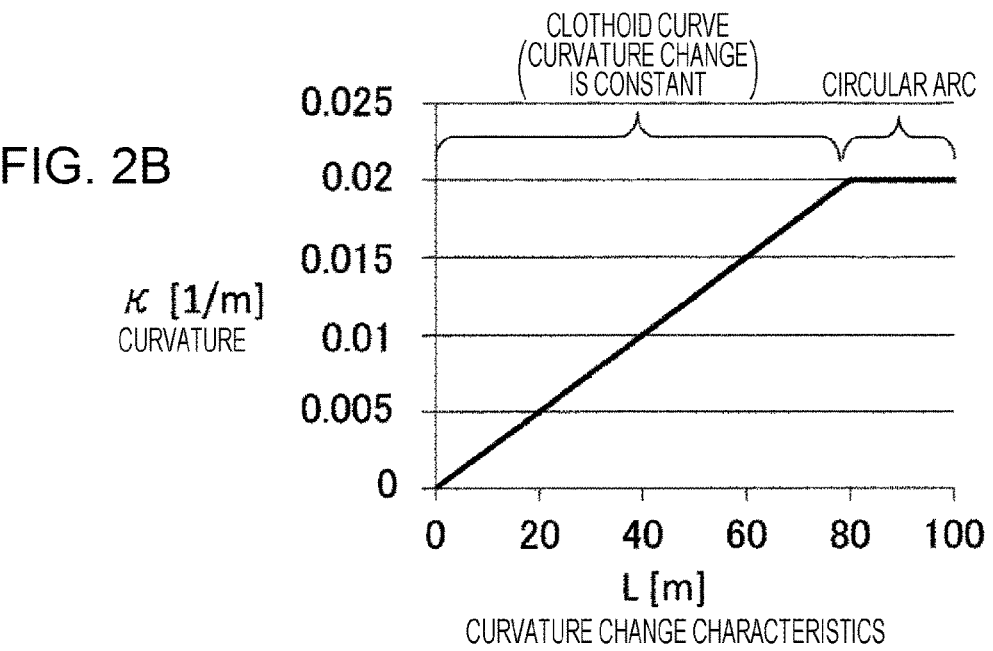

FIG. 2 is a graph illustrating a curve shape of a road designed by connecting the clothoid curve and the arc and a graph illustrating characteristics of curvature changes with respect to a travel distance L on the trajectory along the curve shape. A section of the clothoid curve of 80 [m] is provided so as to connect to an arc with a radius of 50 [m] indicated by a dotted line, that is, a curvature κ0.02 [1/m], and a range of the clothoid curve of 100 [m] is indicated by a solid line in the graph.

Figure 3A:
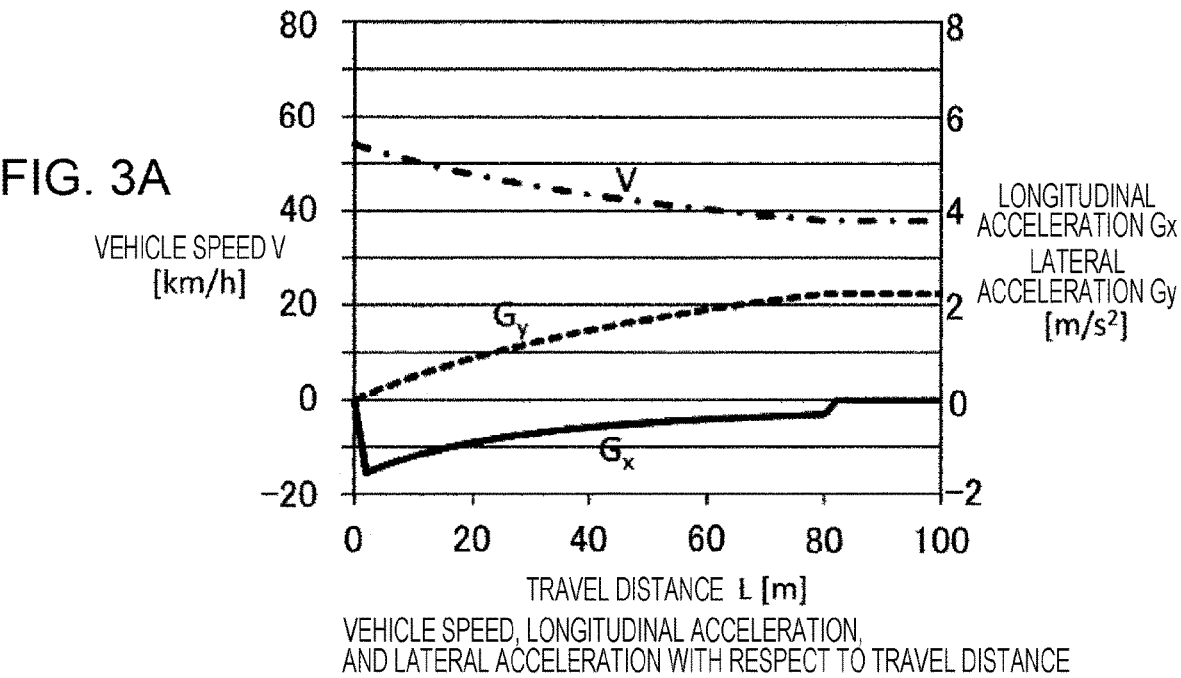
FIG. 3 is a graph (a) illustrating a relationship between a vehicle speed, longitudinal acceleration, and lateral acceleration with respect to a travel distance when curve traveling is performed in a curve in FIG. 2 by controlling the longitudinal acceleration according to lateral jerk in the curve and a graph (b) illustrating a relationship of the lateral acceleration with respect to the longitudinal acceleration.
Figure 3B:
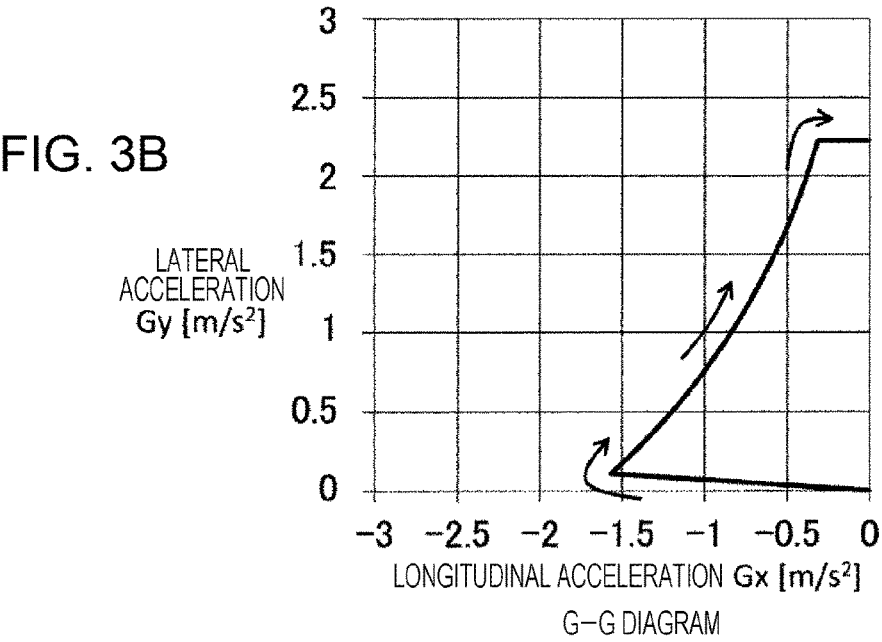

FIG. 3 illustrates a result obtained by calculating a vehicle speed V, the longitudinal acceleration Gx and the lateral acceleration Gy in a case where cruising along the curve shape in FIG. 2 is performed according to the GVC, on the basis of Equations 4 and 5 and a G-G diagram drawn on the basis of the result. A magnitude |G| of the acceleration vector will be described later with reference to FIG. 4. When the vehicle whose acceleration/deceleration is controlled by the GVC is traveling on the clothoid curve road in accordance with the shape of the road, since the lateral jerk is discontinuous at the point where the vehicle enters the clothoid curve from the straight line, a deceleration command theoretically becomes infinite, excessive deceleration occurs, and the G-G diagram becomes a pointed shape. This is the same even if the control to predictively decelerate from the straight section is superimposed.

Furthermore, since the lateral jerk is discontinuous even at the point connected in an arc from the clothoid curve, the deceleration command instantaneously becomes 0, and the G-G diagram also has a pointed shape also at this point.

Here, a preferred G-G diagram shape will be described from a viewpoint of the transition of the magnitude of the acceleration vector.

Figure 4:
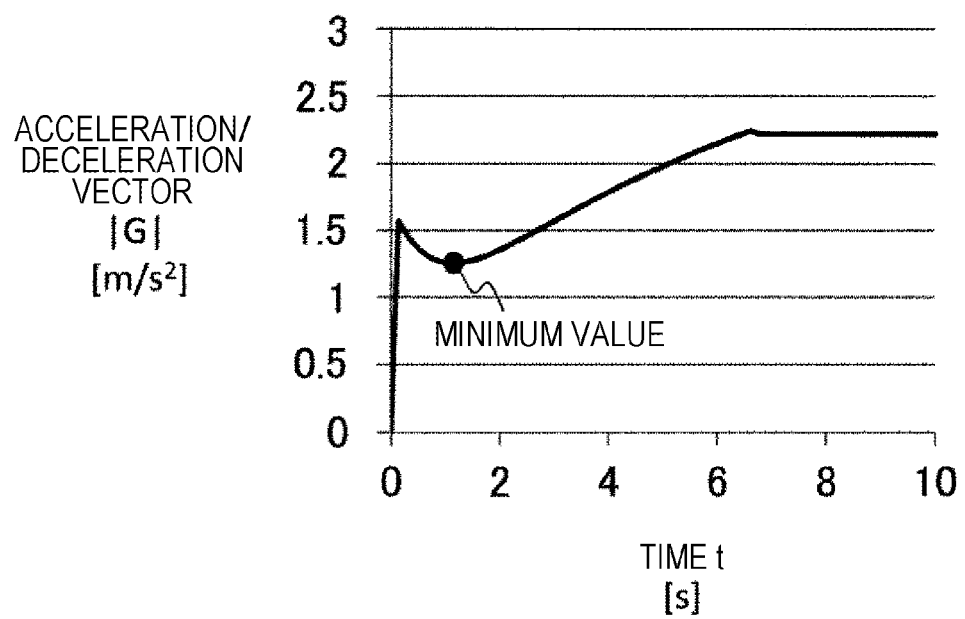
FIG. 4 is a diagram illustrating transition of a magnitude of a combined acceleration vector of the longitudinal acceleration and the lateral acceleration in FIG. 3.

FIG. 4 illustrates the transition of the magnitude |G| of the acceleration vector when the vehicle travels along on the curve shape in FIG. 2 according to the GVC. As the magnitude of the acceleration vector increases once due to deceleration and thereafter the lateral acceleration does not increase when the deceleration decreases, a sharp point is generated in the G-G diagram as illustrated in FIG. 3. Thereafter, the lateral acceleration increases further. Therefore, a minimum value as the transition of the magnitude of the acceleration vector is generated.

Figure 5A:
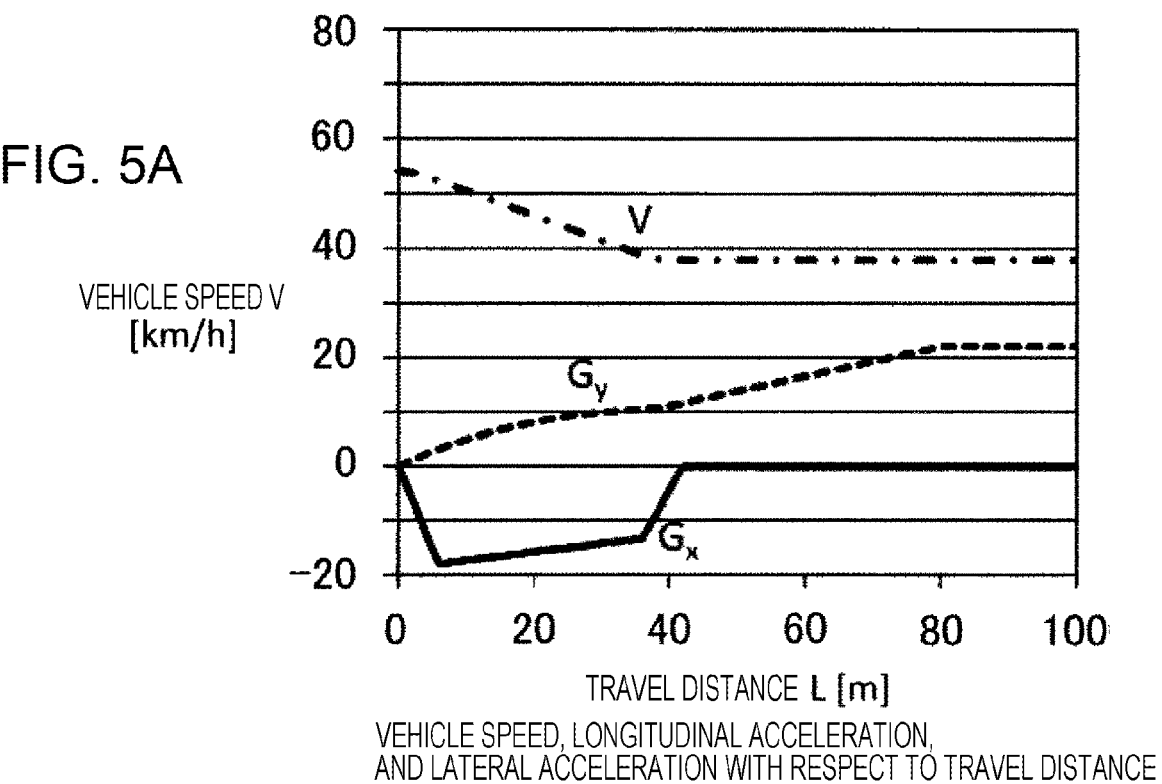
FIG. 5 is a graph (a) illustrating a relationship between the vehicle speed, the longitudinal acceleration, and the lateral acceleration with respect to the travel distance when in the curve in FIG. 2, deceleration is ended within a clothoid curve section in front of the curve and afterward curve traveling is performed and a graph (b) illustrating a relationship of the lateral acceleration with respect to the longitudinal acceleration.
Figure 5B:
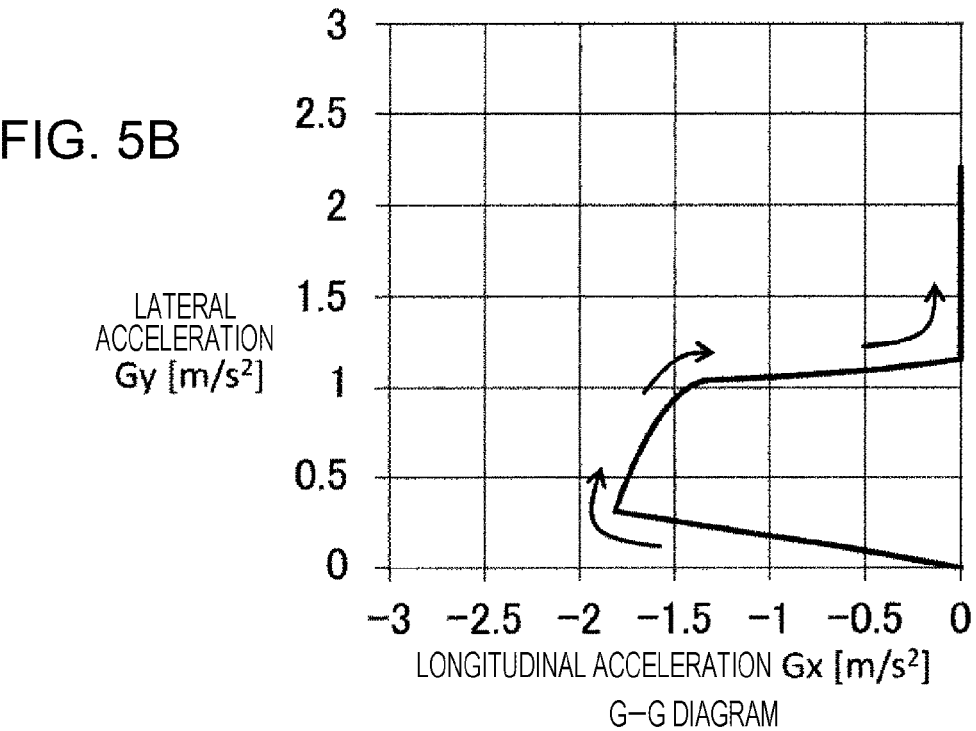
Figure 6:
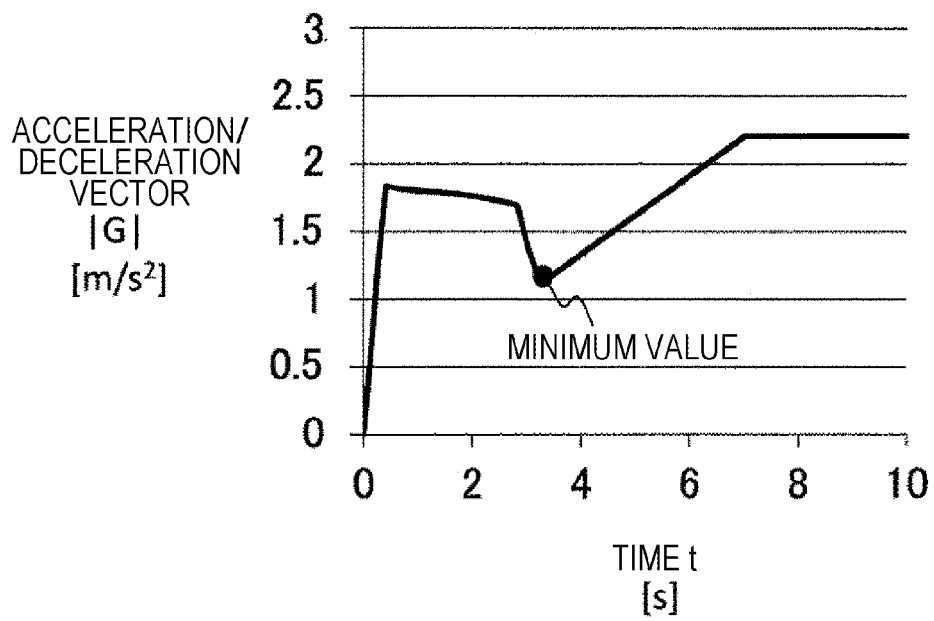
FIG. 6 is a diagram illustrating transition of a magnitude of a combined acceleration vector of the longitudinal acceleration and the lateral acceleration in FIG. 5.

FIG. 5 illustrates the longitudinal acceleration Gx and the lateral acceleration Gy in a case where deceleration is performed for the same curve shape regardless of the GVC and the deceleration is ended at the beginning of the curve. FIG. 6 illustrates the transition of the magnitude |G| of the acceleration vector at that time. In this case also, since the longitudinal acceleration and the lateral acceleration are not connected, the magnitude of the acceleration vector has a minimum value, and the G-G diagram is formed into a pointed shape. In any of the above cases, the change in the magnitude of the acceleration gives the occupant sitting in the vehicle a feeling as if his or her upper body and head is shaken.

Therefore, if the magnitude of the acceleration vector does not have a minimum value, the magnitude of the acceleration vector that increased once decreases monotonously until the magnitude of the acceleration vector becomes the magnitude of the acceleration vector at the time of traveling at a constant speed along the arc. As a result, it can be said that the G-G diagram is almost in an arc, and the comfort of the occupant is maintained.

In order to suppress the sharpness of the G-G diagram, there is a method of adding a temporary delay element to the deceleration command and increasing the time constant as much as necessary. However, the deceleration is delayed with respect to turning though the trajectory does not change. Therefore, this delay of the deceleration may give the occupant an uneasy feeling.

Figure 7:
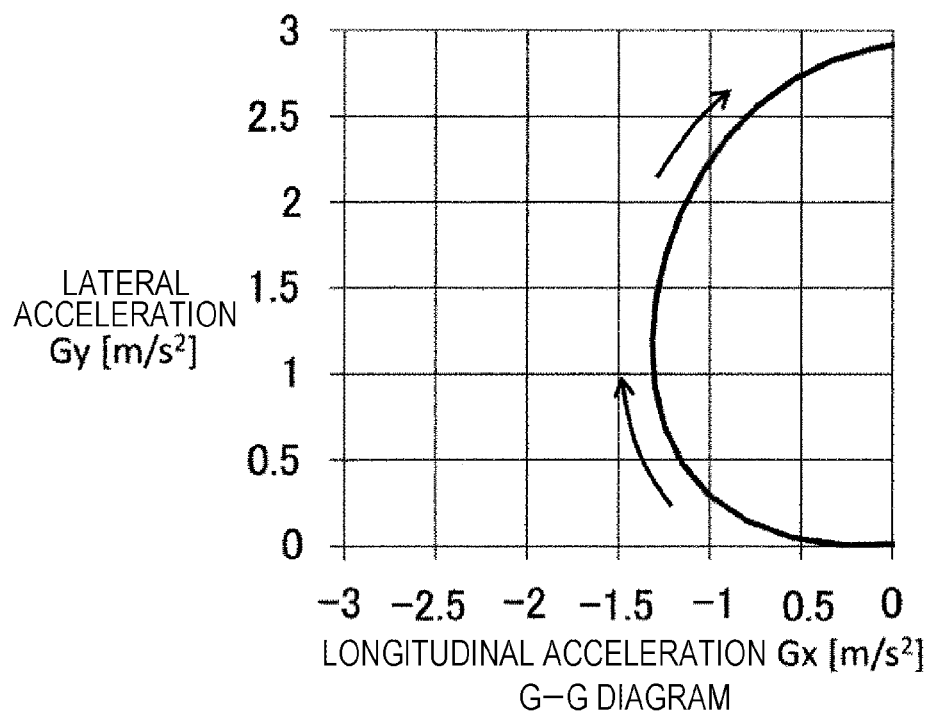
FIG. 7 is a diagram illustrating a relationship between the lateral acceleration and the longitudinal acceleration with good ride comfort during curve traveling.

Therefore, it can be said that the trajectory of the clothoid curve is not suitable for cooperation between the longitudinal motion and the lateral motion. To utilize the GVC, it is desirable to perform steering such that the travel trajectory itself of the vehicle transitions in an arc in the G-G diagram as illustrated in FIG. 7.

However, since the (estimated) trajectory by steering such that the G-G diagram transitions in an arc and the real curve shape (target trajectory) are different, in a case of perform steering from a curve start point in the curve shape, there is a new possibility of a traffic lane deviation.

Figure 8:
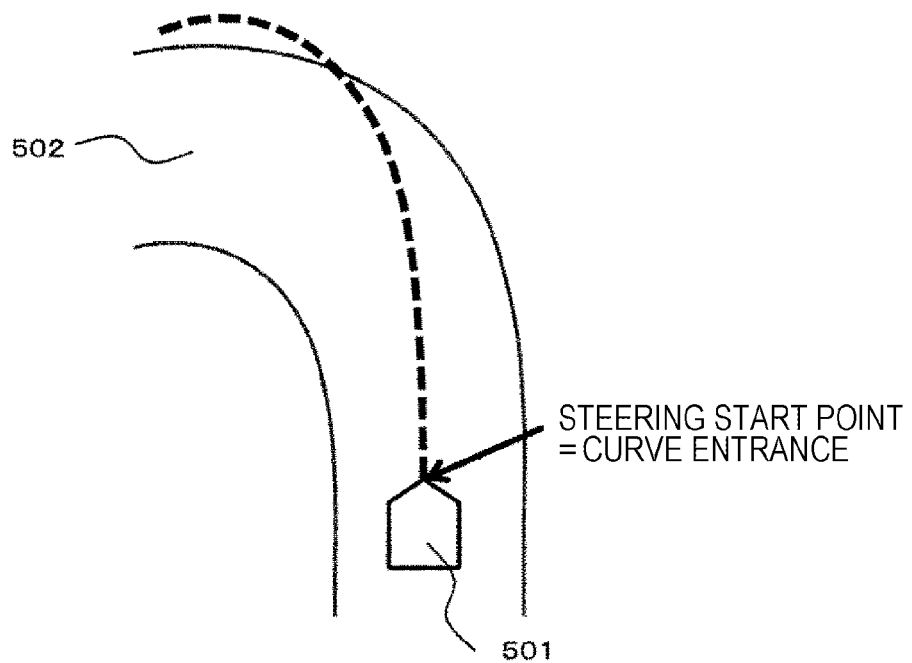
FIG. 8 is a diagram illustrating a problem in a case where steering is performed to draw a trajectory having characteristics as illustrated in FIG. 7.

For example, as illustrated in FIG. 8, when an own vehicle 501 enters a curve while traveling on an own traffic lane 502, steering for curve traveling is started at the time of entering the curve, and steering (broken line in FIG. 8) is performed such that the G-G diagram transitions in an arc, the vehicle 501 deviates from the own traffic lane 502 and cannot safely travel within the own traffic lane 502.

Therefore, the steering start point judgment apparatus according to the present invention sets the steering start point according to the shape of the traffic lane in a real environment such that the trajectory where the G-G diagram changes in an arc falls within the actual curve shape for steering during curve traveling. With this setting, safe and comfortable traveling without a traffic lane deviation is achieved. In the case example of FIG. 8, by setting the steering start point to the front of the curve, the trajectory in which the G-G diagram changes in an arc can fall within the actual curve shape.

Hereinafter, the steering start point judgment apparatus 201 will be described.

Figure 9:
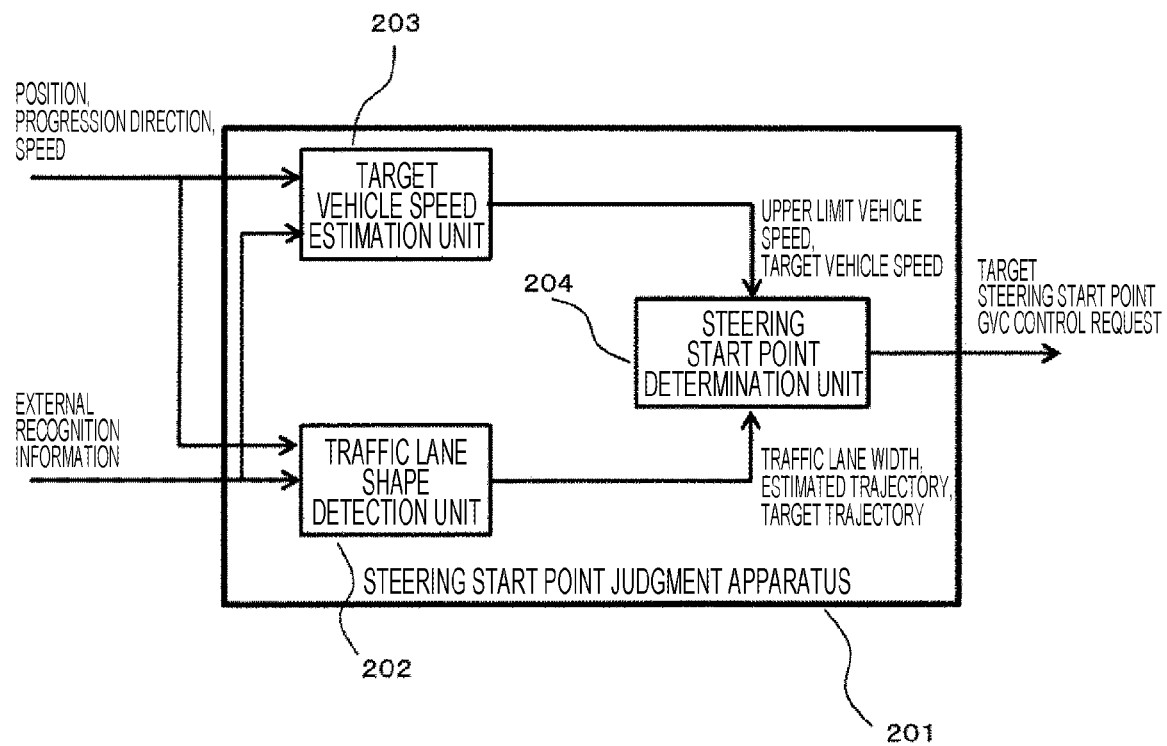
FIG. 9 is a diagram illustrating a configuration and input/output of a steering start point judgment apparatus.

FIG. 9 illustrates a configuration of the steering start point judgment apparatus 201. The steering start point judgment apparatus 201 includes a traffic lane shape detection unit 202, a target vehicle speed estimation unit 203, and a steering start point determination unit 204.

The traffic lane shape detection unit 202 obtains lane shape information such as traffic lane width and curve curvature from object information and road surface information detected from an external recognition device such as a stereo camera, a millimeter wave radar, a laser radar, and the like. Furthermore, the traffic lane shape information of a path of travel may be obtained while the position of the vehicle is specified by a global positioning system (GPS) or the like on a map provided in the vehicle itself.

Then, the traffic lane shape detection unit 202 calculates the target trajectory for traveling along the center of the traffic lane and an estimated trajectory in the case of performing GVC control, from the obtained lane shape information, the vehicle speed, the current position, and the progression direction.

On the basis of the curve curvature in a progression direction of the own vehicle that is obtained from the external recognition device, the target vehicle speed estimation unit 203 calculates an upper limit vehicle speed at which the vehicle can safely turn at a constant vehicle speed even if there is no acceleration/deceleration control based on the lateral motion like the GVC and a target vehicle speed that is a vehicle speed at the time of entering the curve when spontaneous deceleration control (brake drive) is not performed.

Figure 10:
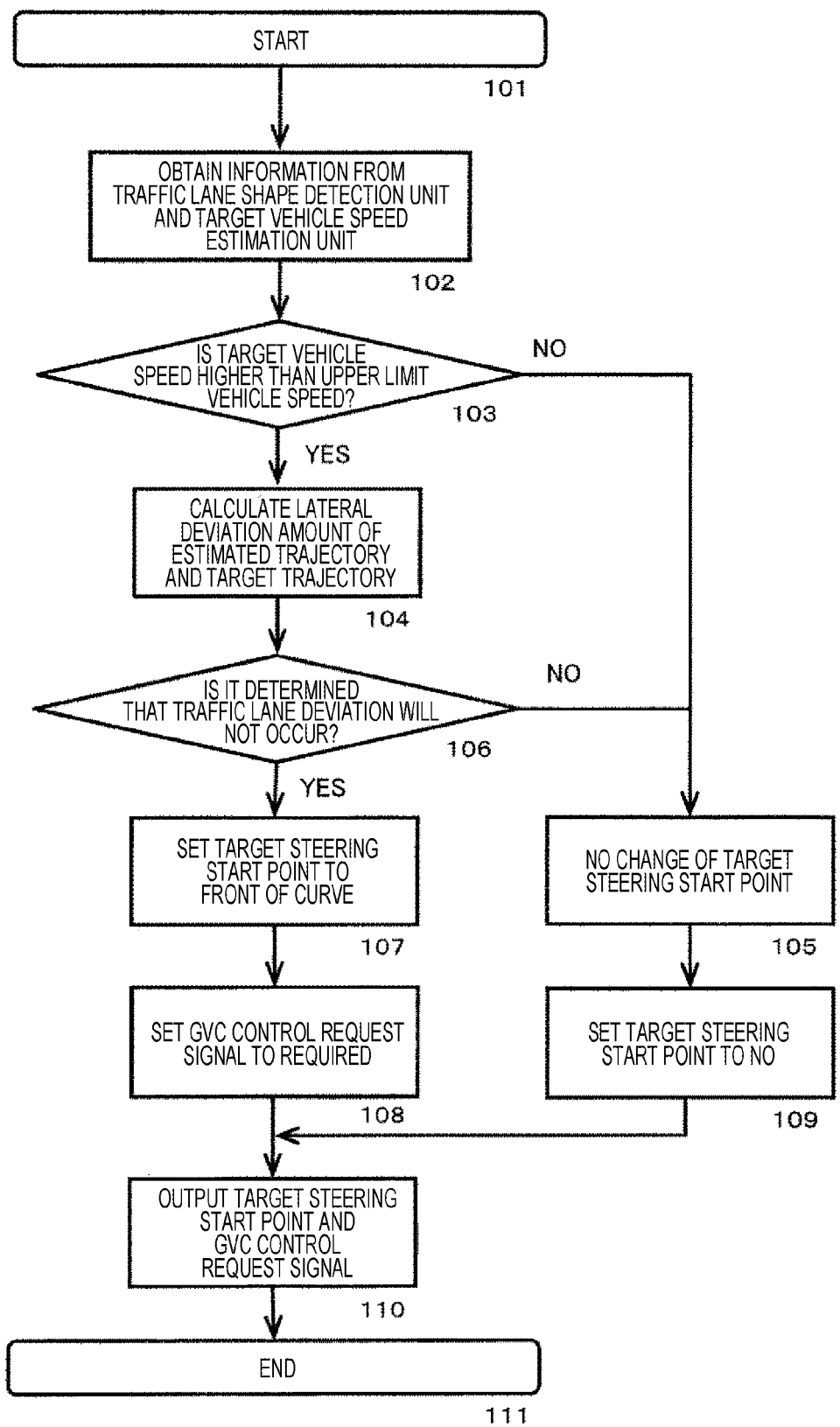
FIG. 10 is a flowchart illustrating processing of a steering start point determination unit.

FIG. 10 illustrates the processing of the steering start point determination unit.

The steering start point determination unit 204 firstly obtains information transmitted from the traffic lane shape detection unit 202 and the target vehicle speed estimation unit 203 (102).

Next, the target vehicle speed at the time of entering the curve obtained by the target vehicle speed estimation unit 203 is compared with the upper limit vehicle speed, and it is determined whether curve traveling by the GVC is necessary (103).

In a case where curve traveling by the GVC becomes necessary in the determination (103), the lateral deviation amount between the estimated trajectory due to the curve traveling by the GVC and the center of the own traffic lane that is the target trajectory is calculated (104), and it is determined whether a traffic lane deviation will not occur (106).

Meanwhile, in a case where curve traveling by the GVC becomes unnecessary as a result of the determination (103), curve traveling by the GVC is not performed in this curve, and the target steering start point is set to a predetermined steering start point as is (105) and a GVC control request signal is set to "No" (109).

In other words, in a case where the target vehicle speed is higher than the upper limit vehicle speed, curve traveling by the GVC is performed, and in a case where the target vehicle speed is lower than the upper limit vehicle speed, curve traveling by the GVC is not performed. This is because in such a case, when the vehicle is decelerated sufficiently in front of the curve (or in a low speed state) and further decelerated, there is a possibility that this further deceleration may give a driver a rather uncomfortable feeling.

In a case where the determination (103) is "YES", it is determined whether a traffic lane deviation due to the change of the steering start point will does not occur when the own vehicle performs curve traveling by the GVC, on the basis of on the calculated deviation amount between the estimated trajectory by curve traveling by the GVC and the center of the own traffic lane that is the target trajectory (106).

In a case where in the determination (106), it is determined that a traffic lane deviation will not occur, the steering start point at which a traffic lane deviation will not occur is set to the target steering start point (107) and the GVC control request signal is set to "Required" (108).

Meanwhile, in a case where in the determination (106), it is determined that a traffic lane deviation will occur, the target steering start point is set to the predetermined steering start point as is and is not changed (105) and the GVC control request signal is set to "No" (109).

The above has described control that sets the steering start point to the front of the curve in order to perform curve traveling by the GVC because in a case where the target vehicle speed at the time of entering the curve that is obtained by the target vehicle speed estimation unit 203 is higher than the upper limit vehicle speed, it is necessary to perform stable curve traveling by performing curve traveling by the GVC.

However, in the case where the vehicle speed is so high that the vehicle cannot travel stably only by the GVC, it is more desirable to perform control to adjust to an appropriate vehicle speed by activating the deceleration control before start of steering for safety.

For example, an actuator is given a deceleration command to decelerate before start of steering such that the target vehicle speed falls below the upper limit vehicle speed. In this case, the GVC command is "No". In this case, it is also possible to adopt a method of reducing the sense of discomfort to large deceleration in front of the curve by notifying the driver to that effect.

For example, when the vehicle performs curve traveling by the GVC at the target vehicle speed, the actuator is given a deceleration command to decelerate before start of steering to the extent that a traffic lane deviation due to the change of the steering start point does not occur. In this case, the GVC command is "Required".

Finally, the target steering start point and the GVC control request signal are output as signals for calculating a control amount for driving each actuator provided in the vehicle (110).

Table 1 is a summary regarding a method of setting the steering start point according to a state of each parameter.

As illustrated in Table 1, the present invention considers a degree as to how far the steering start point is from the front of the curve. A numeric value illustrated in the degree as to how far steering start point is from front of curve represents a relationship of a degree as to how far the steering start point is from the front of the curve among respective parameters.

TABLE 1

Example of steering start point determination apparatus

| No. | Own vehicle speed with respect to curvature of approaching curve | Traffic lane width | Curve curvature | Steering starting point | Degree as to how far steering start point is from front of curve (0: No change <=> 1: Most far from in front of curve) |
|---|---|---|---|---|---|
| 1 | Fast | Wide Middle | Large | In front of curve | 1 |
| 2 | | | Small | In front of curve | 0.5 |
| 3 | | Narrow Wide | Large | In front of curve | 0.5 |
| 4 | | | Small | In front of curve | 0.25 |
| 5 | | Middle | Large | No change | 0 |
| 6 | | | Small | No change | 0 |
| 7 | Slow | Wide | Large | No change | 0 |
| 8 | | Middle | Small | No change | 0 |
| 9 | | Narrow | Large | No change | 0 |
| 10 | | Wide | Small | No change | 0 |
| 11 | | Middle | Large | No change | 0 |
| 12 | | | Small | No change | 0 |

Figure 11:
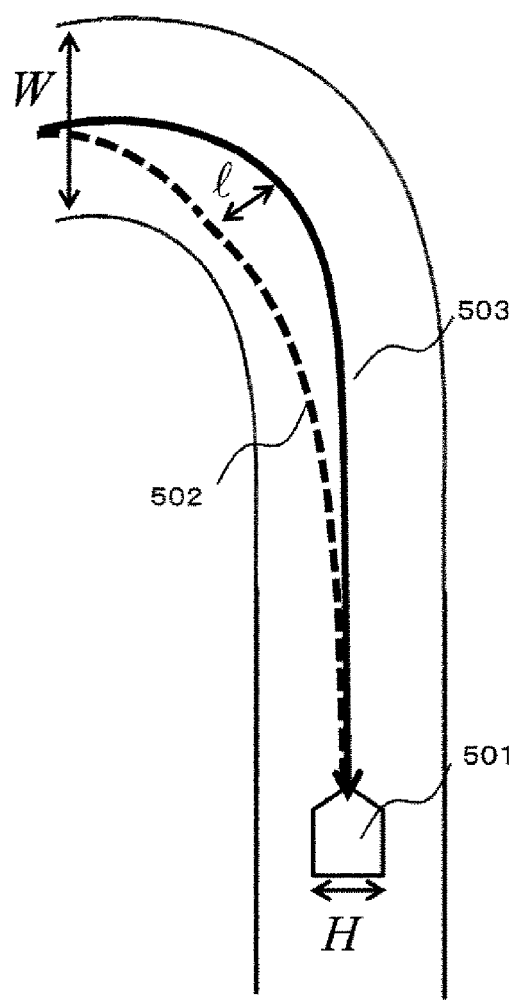
FIG. 11 is a diagram illustrating a steering start point when curve traveling by GVC is performed.

As illustrated in FIG. 11, the vehicle 501 travels along the center of the traffic lane as a target trajectory 503. When a curve is detected, an estimated trajectory 502 that considers acceleration/deceleration during steering can be calculated. However, the estimated trajectory 502 is not limited to the one illustrated in the present embodiment as long as the estimated trajectory 502 is a trajectory that considers acceleration/deceleration during steering like the one as described above.

The lateral deviation of the target trajectory 503 and the estimated trajectory 502 along the center of the traffic lane with respect to a position in the progression direction of the vehicle 501 is represented as 1. A point in time when 1 satisfies the following determination equation 6 where a traffic lane width W and a vehicle width H detected by the traffic lane shape detection unit are inputs is taken as the target steering start point. The determination of Equation 6 is performed every control cycle.

$$\frac{W}{2} > \ell_t + H + \alpha \quad \text{[Equation 6]}$$

However, α represents a margin width and can be set arbitrarily.

In other words, as the traffic lane width W is wider, the target steering start point can be set to a point farther from the front of the curve.

Effect of First Embodiment

According to the first embodiment of the present invention, since the vehicle can travel on a trajectory for which the G-G diagram draws an arc on a curved road. Therefore, it is possible to perform automated driving to improve ride comfort of the driver.

Furthermore, it is determined whether curve control by the GVC is possible at a speed in the current state. In the case where the speed in the current state is a speed at which GVC control is possible, there is no need to generate unnecessary deceleration control before the start of steering except for acceleration/deceleration linked to steering. Therefore, the vehicle can travel smoothly on the curved road.

Furthermore, according to a further desirable mode, even in the case of a speed at which the GVC control is not possible, deceleration is performed once until the speed reaches a speed at which the GVC is possible, and then the above control is performed. Therefore, deceleration before the start of steering can be suppressed to a necessary minimum, and the vehicle can travel smoothly and safely on the curved road.

Second Embodiment

A second embodiment of the present application will be described. The second embodiment is an example of a cruise control apparatus that incorporates the steering start point judgment apparatus 201 in the first embodiment and is installed in a vehicle.

The vehicle has a mechanism that performs steering and acceleration/deceleration by a control command of the cruise control apparatus without depending on the operation of a driver. This mechanism is indispensable for an automated driving function and can be utilized also for a driving support function that assists the operation of the driver.

Figure 12:
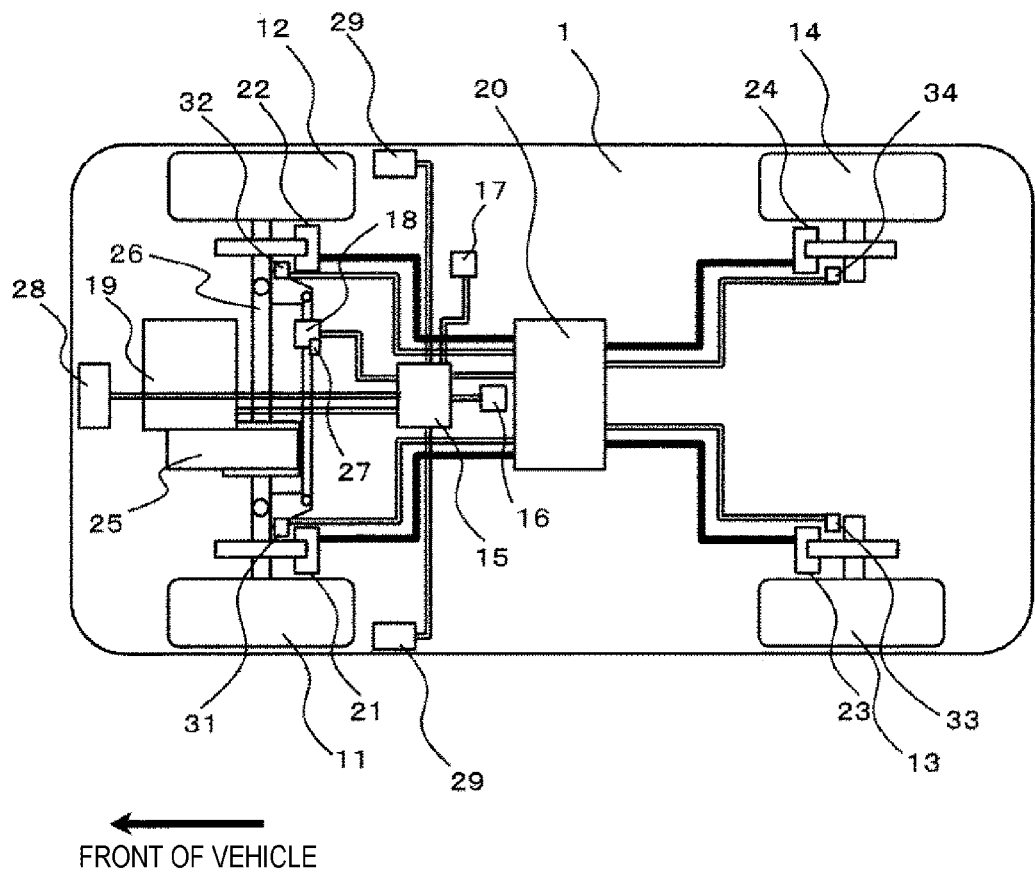
FIG. 12 is a diagram illustrating various devices and a system configuration of a vehicle to be controlled.

FIG. 12 is a view illustrating various apparatuses and a system configuration of the vehicle 1 to be controlled.

A steering device 18 is provided with electric power steering (EPS). In addition to a function as power steering for amplifying steering force by the driver, the EPS has a function to receive a control command transmitted by the cruise control apparatus 15, and perform steering, as an active actuator, a left front wheel 11 and a right front wheel 12 without depending on the operation of the driver.

A drive device 19 includes an internal combustion engine or an electric motor or both of the internal combustion engine and the electric motor. The drive device receives a control command transmitted by the cruise control apparatus 15, causes the left front wheel 11 and the right front wheel 12 that are driving wheels to generate driving force via a decelerator 25 and a driving shaft 26 and causes the vehicle 1 to travel. Furthermore, the drive device 19 causes the driving wheels to generate braking force and causes the vehicle 1 to decelerate. According to the control command, acceleration/deceleration can be performed without depending on the operation of the driver.

A brake control device 20 has a function to receive a control command transmitted by the cruise control apparatus and control the braking force by applying hydraulic pressure to braking devices 21 to 24. According to the control command, deceleration can be performed without depending on the operation of the driver.

The braking devices 21 to 24 operate in response to receiving the hydraulic pressure from the brake control device 20 and generate braking force on four wheels 11 to 14.

Information from wheel speed sensors 31 to 34 via a GPS sensor 17, an inertial sensor 16, a camera 28 that acquires information of an external world in front of the vehicle, a side image sensor 29, and the braking control device is input to the cruise control apparatus 15. On the basis of those pieces of information, the cruise control apparatus 15 sends a control command to the steering device 18, the drive device 19, and the brake control device 20 and controls the motion of the vehicle 1.

The configuration of each device may be divided or integrated. For example, the braking devices 21 to 24 and the drive device 19 as braking/driving devices may cooperatively control the braking force, and the steering device 18 may include a steering mechanism and a steering control device.

The vehicle has a mechanism that performs steering and acceleration/deceleration by a control command of the cruise control apparatus without depending on the operation of a driver. This mechanism is indispensable for an automated driving function and can be utilized also for a driving support function that assists the operation of the driver.

Third Embodiment

Figure 13:
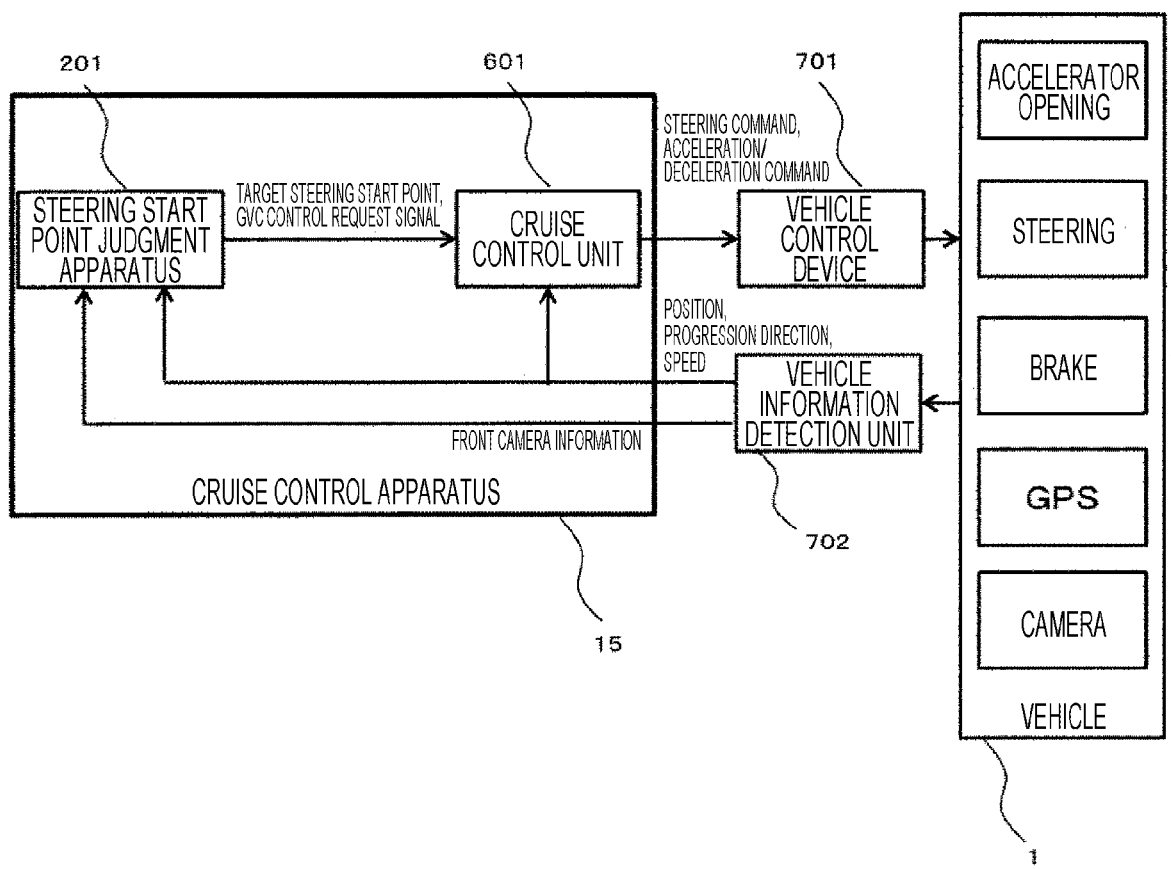
FIG. 13 is a diagram illustrating a processing configuration of a cruise control apparatus.

A third embodiment of the present application will be described with reference to FIGS. 13 and 14. Description of configurations and effects similar to those of the first embodiment will be omitted. The third embodiment is an example in which a steering start point judgment apparatus 201 is applied to a cruise control apparatus 15 provided in a vehicle 1 to be controlled.

The cruise control apparatus 15 includes the steering start point judgment apparatus 201 and a cruise control unit 601.

A vehicle control device 701 drives each actuator on the basis of a steering command and an acceleration/deceleration command output from the cruise control apparatus 15.

The steering start point judgment apparatus 201 includes a traffic lane shape detection unit 202, a target vehicle speed estimation unit 203, and a steering start point determination unit 204.

Information of an external world obtained in real time from a camera 28 that photographs the external world in front of the vehicle and a current position, a travelling direction, and a speed of a vehicle are input to the steering start point judgment apparatus 201.

Furthermore, as information of a curve shape of a road including a traffic lane width, map information obtained in advance and information of a trajectory generated in advance on the basis of the map information are held.

The position, the progression direction, and the speed of the vehicle are obtained by integrating and improving the accuracy of information of a GPS sensor 17, an inertial sensor 16 that detects acceleration and an angular speed, wheel speed sensors 31 to 34, a steering angle sensor 27, and a side image sensor 29 that detects a traffic lane or a road end.

In a case where the traffic lane width detected by the traffic lane shape detection unit 202 is narrow, since there is no allowable range of a lateral shift for advancing the steering start point, it is impossible to advance the steering start point to a point farther from the front of a curve. In this case, since it is necessary to travel along the trajectory in a center of the traffic lane, if a vehicle speed is higher than an upper limit vehicle speed at the time of entering the curve, deceleration is performed before reaching the front of a curve entrance. After entering the curve, curve traveling by GVC is not performed and turning at a constant speed as in ordinary automated driving is performed by the vehicle control device 701.

In a case where the traffic lane width is "wide", it is possible to set the steering start point to a point farther from the front of the curve than in a case where the traffic lane width is "middle". Therefore, it is possible to perform curve traveling while decelerating simultaneously with steering without deceleration in front of the curve. As the traffic lane width becomes wider, steering can be performed so as to draw a trajectory equivalent to a relaxation curve in a straight section.

A target steering start point is transmitted as a trigger signal for starting steering together with a GVC control request signal to the cruise control unit 601. The cruise control unit 601 that receives the signal of the target steering start point calculates a steering command and a target deceleration command and instructs the vehicle control device 701.

Furthermore, in Table 1, it is assumed that there is no change of the steering start point when the vehicle speed with respect to the curvature of an approaching curve is "slow". This is because oversteering occurs when curve traveling by the GVC is performed in a case where the speed is low. Meanwhile, although the steering start point can be set at a point deeper than the curve entrance, there is a possibility that the vehicle travels in an understeer state when steering starts and a traffic lane deviation occurs. From the viewpoint of safety, it is assumed that there is no change of the steering start point when the vehicle speed is slow.

The vehicle control device 701 sends the steering command by feedforward control to an actuator of a steering device 18 on the basis of an output signal of the cruise control unit 601. At the same time, the vehicle control device 701 sends a command also to a drive device 19 and a brake control device 20 to control acceleration/deceleration or the speed.

As the actuator for starting the steering at the target steering start point, the steering device 18 is mainly used. However, the actuator may be used together with other devices. For example, the distribution of braking/driving force of four wheels may be changed by braking devices 21 to 24 or the drive device 19 or a suspension device may be controlled actively.

FIG. 14 illustrates an example illustrating a difference in the steering start point due to a difference in the vehicle width of the vehicle. On the assumption of the same curve shape, in a case where each vehicle (the vehicle width of a vehicle 801 is smaller than the width of a vehicle 811) travels along the curve, a lateral deviation amount $l_1$ of an estimated trajectory 802 of the GVC and a target trajectory 803 in the center of the traffic lane for the vehicle 801 having a large vehicle width is larger than a lateral deviation amount $l_2$ of an estimated trajectory 812 of the GVC and a target trajectory 813 in the center of the traffic lane for the vehicle 811 having a small vehicle width. Therefore, the steering start point can be set at a point farther from the front of the curve on the basis of Equation 6.

As another embodiment to which the present invention is applied, in a case where information of an obstacle can be obtained from an external recognition sensor, a GPS, or the like in advance, the steering start point for avoiding the obstacle can be advanced.

Furthermore, even in a case where the timing of a traffic lane change is known, the steering start point can be advanced in accordance with the timing of the traffic lane change.

The present invention can be applied to any scenes that require turning in addition to scenes such as normal turning at a corner, avoiding an obstacle, changing a traffic lane as described above. The present invention determines whether to perform turning traveling by GVC according to the traffic lane width of a traveling destination route and the vehicle speed at that time and sets the steering start point. As a result, the present invention can provide traveling with safety ensured while ensuring also comfort in the vehicle that automatically performs steering and acceleration/deceleration.

REFERENCE SIGNS LIST 1 vehicle to be controlled
11 left front wheel
12 right front wheel
13 left rear wheel
14 right rear wheel
15 cruise control apparatus
16 inertial sensor
17 GPS sensor
18 steering device
19 drive device
20 brake control device
21 left front wheel braking device
22 right front wheel braking device
23 left rear wheel braking device
24 right rear wheel braking device
25 decelerator
26 drive shaft
27 steering angle sensor
28 camera
29 side image sensor
31 left front wheel speed sensor
32 right front wheel speed sensor
33 left rear wheel speed sensor
34 right rear wheel speed sensor
201 steering start point judgment apparatus
202 traffic lane shape detection unit
203 target vehicle speed estimation unit
204 steering start point determination unit

The invention claimed is:

1. A cruise control apparatus comprising:
an external sensor configured to detect a curve of a traffic lane; and
a control unit in communication with the external sensor, the control unit configured to:
calculate, on the basis of a vehicle speed of a vehicle, an estimated trajectory that satisfies a relationship in which an arc of the curve is determined from a G-G diagram, which is a relationship between lateral acceleration and longitudinal acceleration, wherein the arc is applied to the estimated trajectory;
determine a steering start point at which to start steering control in front of the curve so that the estimated trajectory falls within the curve of the traffic lane, and
output a command to control at least one of steering or a vehicle speed of the vehicle.

2. The cruise control apparatus according to claim 1, wherein the control unit is further configured to:
determine that the estimated trajectory does not fall within the traffic lane; and
transmit the command, which is a deceleration command, to an actuator of the vehicle to decrease the vehicle speed to a speed at which the estimated trajectory falls within the traffic lane.

3. The cruise control apparatus according to claim 1, wherein the control unit is further configured to:
determine that the estimated trajectory does not fall within the traffic lane; and
transmit the command, which is a deceleration command, to an actuator of the vehicle to decrease the vehicle speed to a speed at which traveling at a constant vehicle speed is possible.

4. The cruise control apparatus according to claim 1, wherein the control unit is further configured to determine a target vehicle speed at which curve traveling at a constant speed is possible based on the arc of the estimated trajectory, and compare the vehicle speed to the target vehicle speed.

5. The cruise control apparatus according to claim 4, wherein responsive to determining that the target vehicle speed is larger than a vehicle speed, the control unit transmits the command to control longitudinal acceleration based on a lateral motion of an own vehicle at a timing of the steering start point, and
responsive to determining that the target vehicle speed is smaller than the vehicle speed, the control unit transmits the command to control the vehicle speed and steering along a predetermined travel route.

6. The cruise control apparatus according to claim 1, wherein responsive to determining that a traffic lane width of the curve is larger than a predetermined traffic lane width of the curve, the control unit is configured to transmit the command to start a steering operation from a point earlier than the predetermined steering start point.

7. The cruise control apparatus according to claim 1, wherein the control unit is further configured to determine whether a deviation from a traffic lane occurs on the basis of the estimated trajectory and the arc of the curve and determines a steering start point on the basis of a determined result.

8. The cruise control apparatus according to claim 1, wherein the steering start point is determined on the basis of at least one of a traffic lane width, a vehicle body width, a vehicle speed, a curve curvature, or the estimated trajectory.

9. The cruise control apparatus according to claim 1, wherein a vehicle is controlled on the basis of the estimated trajectory at the steering start point.

10. The cruise control apparatus according to claim 1, wherein the external sensor is one of a stereo camera, a millimeter wave radar or a laser radar.

11. The cruise control apparatus according to claim 1, wherein the curve of the traffic lane is determined from a position of the vehicle in reference to a global positioning system (GPS).

12. A vehicle comprising:
the cruise control apparatus according to claim 1; and
a brake; a steering wheel; and an accelerator, the brake, the steering wheel, and the accelerator being operated on the basis of control commands from the control unit of the cruise control apparatus.

13. A vehicle comprising:
the cruise control apparatus according to claim 4; and
an actuator configured to perform steering without depending on the operation of the driver, the actuator being operable on the basis of control commands received from the control unit of the cruise control apparatus.

* * * * *